Oct. 19, 1937.  E. E. W. KASSNER  2,096,459
ULTRA SHORT WAVE OSCILLATION GENERATOR
Filed Sept. 15, 1934   10 Sheets-Sheet 1
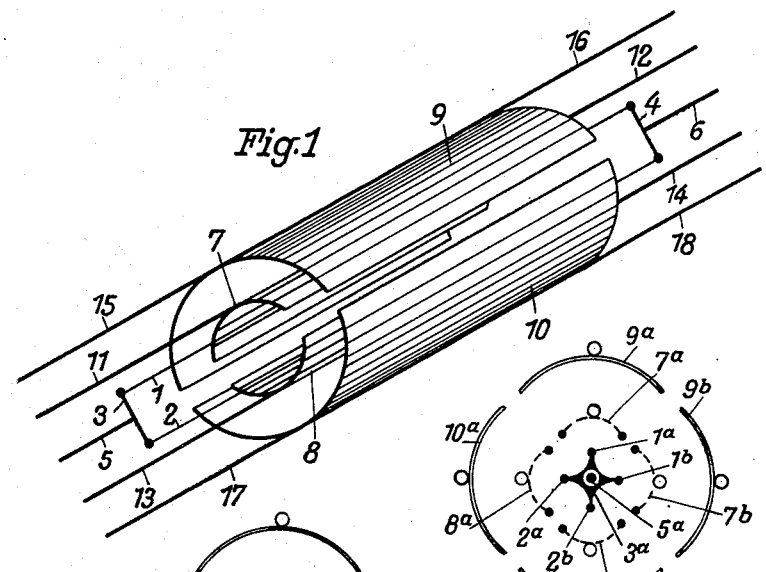
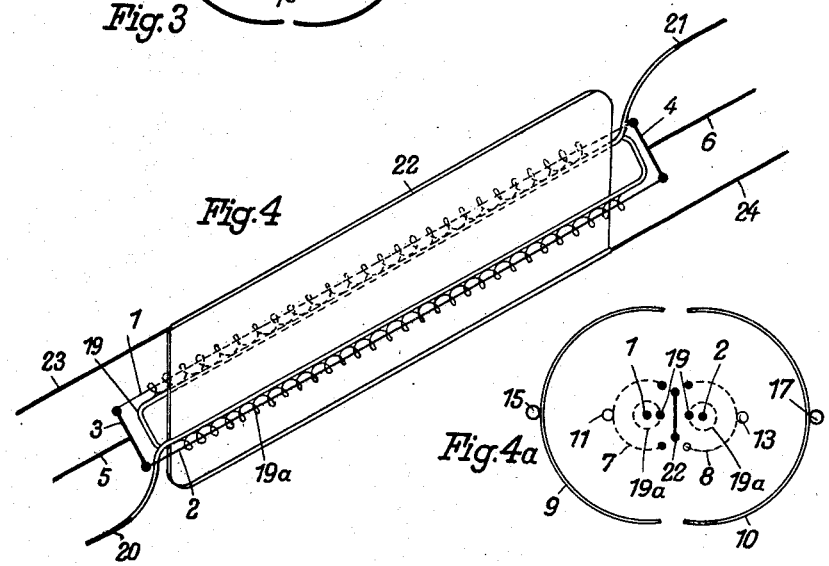
Inventor:
E. W. Kassner

Fig. 5

A — TUNING / RST

| | A-G | A-K | G-K | K |
|---|---|---|---|---|
| 1 | O | | | O |
| 2 | O | O | | |
| 3 | O | | O | |
| 4 | | O | O | |
| 5 | O | O | O | |

B — V

| | System I A-G | System I A-K | System I G-K | System II A-G | System II A-K | System II G-K |
|---|---|---|---|---|---|---|
| 1 | O | O | | O | O | |
| 2 | O | O | | O | | O |
| 3 | O | O | | | O | O |
| 4 | O | O | | O | O | O |
| 5 | O | | O | O | O | |
| 6 | O | | O | O | | O |
| 7 | O | | O | | O | O |
| 8 | O | | O | O | O | O |
| 9 | | O | O | O | O | |
| 10 | | O | O | O | | O |
| 11 | | O | O | | O | O |
| 12 | | O | O | O | O | O |
| 13 | O | O | O | O | O | |
| 14 | O | O | O | O | | O |
| 15 | O | O | O | | O | O |
| 16 | O | O | O | O | O | O |
| 17 | O | O | | | | |
| 18 | O | | O | | | |
| 19 | | O | O | | | |
| 20 | O | O | O | | | |

|   | System I | System II |
|---|---|---|
| a | R | R |
| b | S | S |
| c | T | T |
| d | R | S |
| e | R | T |
| f | S | T |
| g | R | — |
| h | S | — |
| i | T | — |

| COUPLING | |
|---|---|
| α | AI – GII |
| β | GI – AII |

C — RS(T)

| | A-A | G-G | A-G | A-K | G-K |
|---|---|---|---|---|---|
| 1 | l+r | l+r | | | |
| 2 | l+r | l+r | l+r | | |
| 3 | l | r | | | |
| 4 | l | r | l+r | | |
| 5 | l+r | l+r | | l+r | |
| 6 | l+r | l+r | | | l+r |
| 7 | l | r | | l+r | |
| 8 | l | r | | | l+r |
| 9 | l | l | r | l+r | |
| 10 | l | l | r | | l+r |
| 11 | l | l | | l+r | r |
| 12 | l | l | | r | l+r |
| 13 | l | l | r | l+r | r |
| 14 | l | l | r | r | l+r |

D — RST

| | a-g | a-k | a-k |
|---|---|---|---|
| 1 | O | O | |
| 2 | O | | O |
| 3 | | O | O |
| 4 | O | O | O |

Inventor: Ernst E. W. Kassner

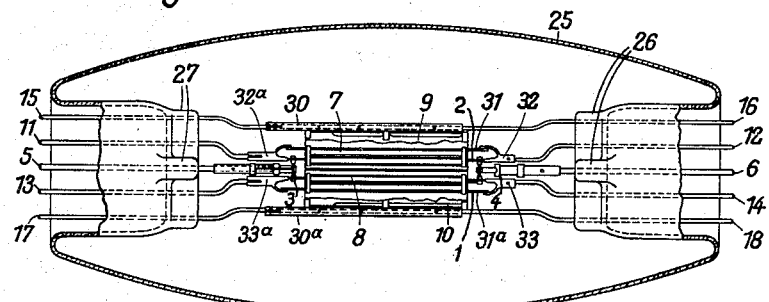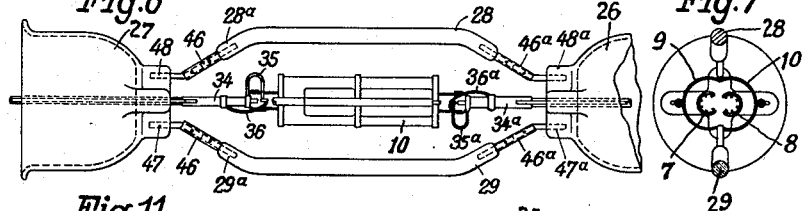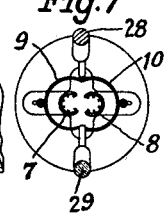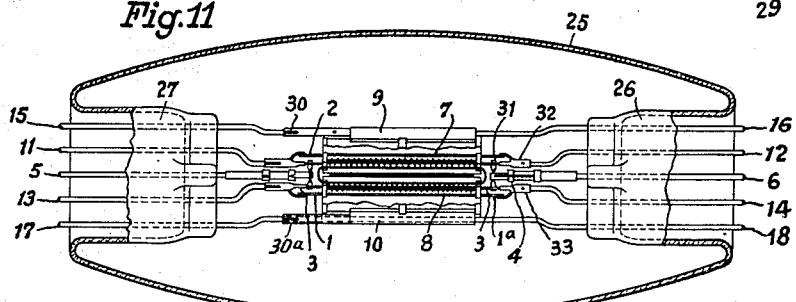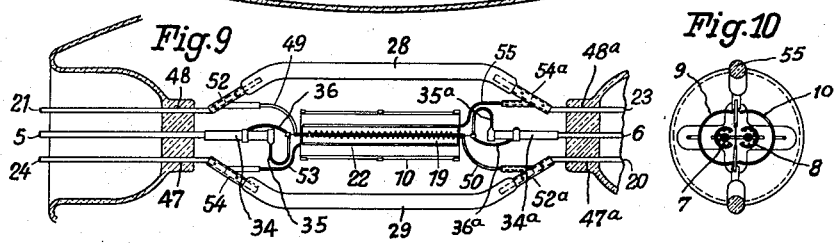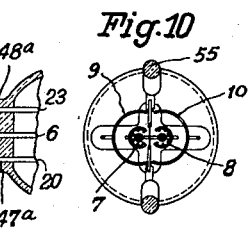

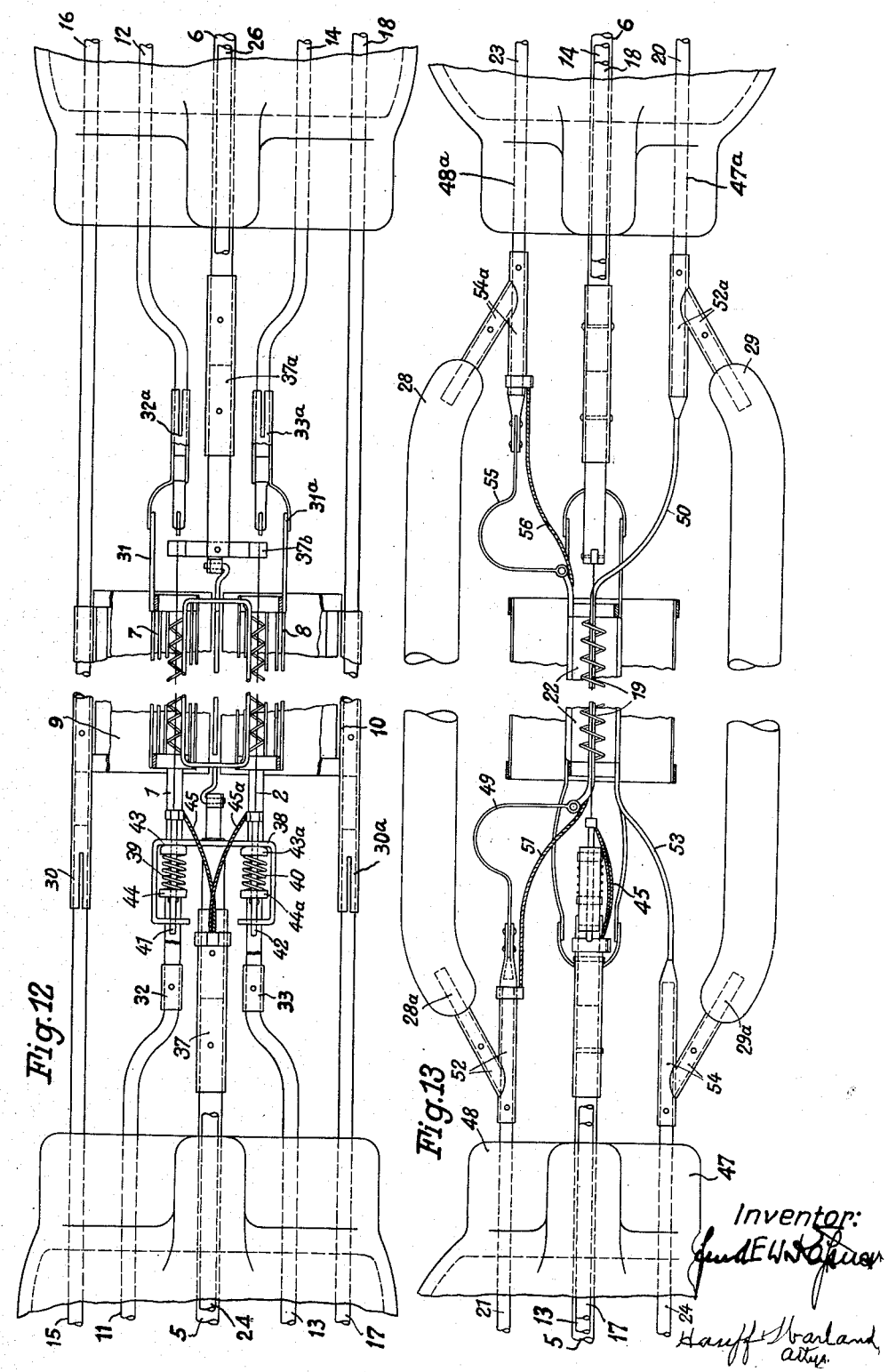

Oct. 19, 1937.  E. E. W. KASSNER  2,096,459
ULTRA SHORT WAVE OSCILLATION GENERATOR
Filed Sept. 15, 1934   10 Sheets-Sheet 5

Oct. 19, 1937. E. E. W. KASSNER 2,096,459
ULTRA SHORT WAVE OSCILLATION GENERATOR
Filed Sept. 15, 1934 10 Sheets-Sheet 6

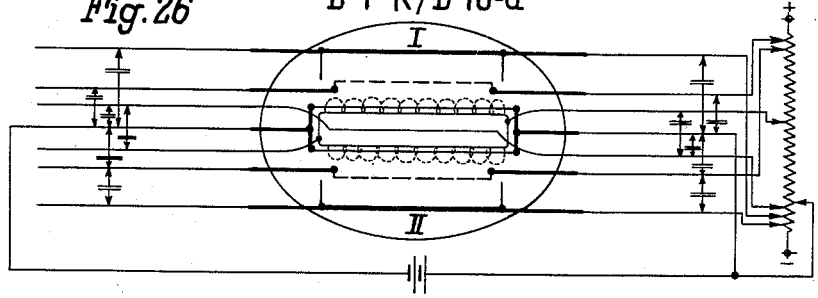
Fig. 26 — D 1-R/B 10-a
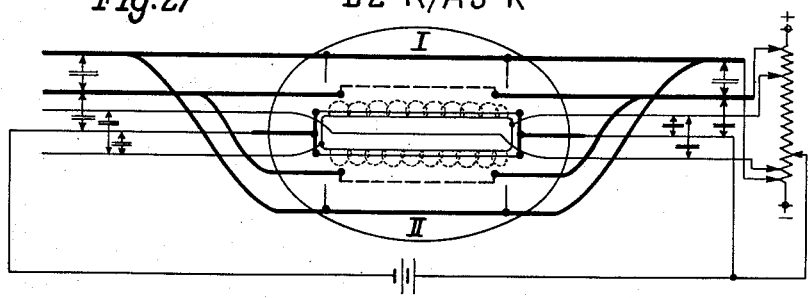
Fig. 27 — D 2-R/A 3-R
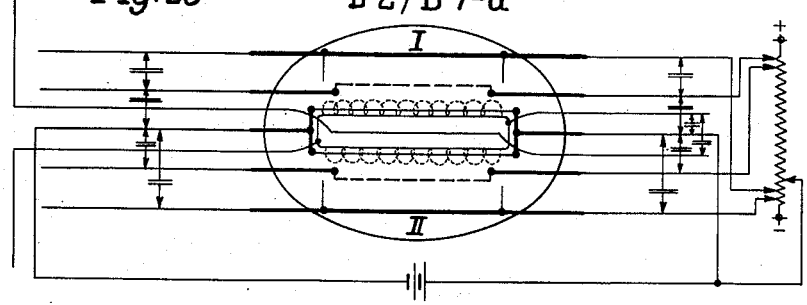
Fig. 28 — D 2/B 7-a
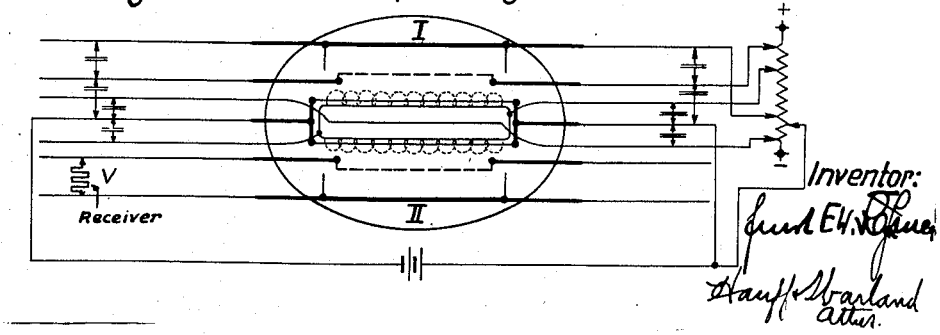
Fig. 29 — D 3/B 18-g Oct. 19, 1937.　　E. E. W. KASSNER　　2,096,459
ULTRA SHORT WAVE OSCILLATION GENERATOR
Filed Sept. 15, 1934　　10 Sheets-Sheet 9

Inventor:

Oct. 19, 1937.　　　　E. E. W. KASSNER　　　　2,096,459
ULTRA SHORT WAVE OSCILLATION GENERATOR
Filed Sept. 15, 1934　　10 Sheets-Sheet 10

Inventor:

Patented Oct. 19, 1937

2,096,459

UNITED STATES PATENT OFFICE 2,096,459

ULTRA SHORT WAVE OSCILLATION GENERATOR

Ernst Eduard Wilhelm Kassner, London, England

Application September 15, 1934, Serial No. 744,160½. In Germany August 31, 1933

11 Claims. (Cl. 250—36)

The valve generators and electron space charge oscillators for generation of undamped ultra-short and quasi-optical waves of the centimetre and decimetre wave spectrum which are well known in high frequency technics, generally do not permit the extraction of a sufficiently large amount of energy for many technical purposes, except possibly within closely limited frequency ranges. One of the main reasons for this fact, especially with respect to the generation of frequencies in the quasi-optical region is because of the internal and external distributed electrode capacities of the valve systems which effect the resonant frequency of the system.

These detrimental capacities, which form short-circuits and wave-bridges for quasi-optical waves can, as a rule, only be diminished by reducing the physical dimensions of the system. For instance, in cases where an oscillation intensity of sufficient effective power is required, a reduction in dimensions of the valve electrodes and supports results in a thermal overstraining of the materials of construction which causes deformations of the electrodes or may result in destruction of the valve.

Moreover, the generation of waves in the quasi-optical region requires far reaching consideration of the conditions of excitation, coupling, wave conduction and tuning, in addition to avoiding the wave shock joints, so that in most cases no optimum operating conditions can be effected with the hitherto existing types of valves.

However, for numerous technical and scientific purposes as well as for extensive measuring- and laboratory-tests, it is necessary to provide a simple means to establish oscillations in the quasi-optical band ranging over several octaves which are stable and of high intensity.

The change of frequency and wave length should not, however, be effected by changing the types of valves or by changing the construction of the transmitter, but should be effected by adjustment of the tuning means or of the wave conductors which conduct the oscillation energy as well as by adjustment of the current and voltage.

The present invention, accordingly, provides a valve and a coupling system which complies with the above mentioned conditions providing greater power and maximum stable breadth of frequency band, especially in the quasi-optical and the ultra-short wave spectrum.

A feature of the invention consists in the symmetrical arrangement of the anode-grid systems with respect to the axis of the common cathode system whereby the detrimental effect of capacity, wave shock joints, etc. are reduced to a minimum.

The transmitter valve may be connected to an oscillating circuit in many alternative ways as shown by the table in Fig. 5 and according to the type of connection used, can be excited to oscillate at different frequency bands and is characterized by exceptional stability of oscillation.

The intermediate electrode system is another feature of the invention and is used for the purpose of producing harmonics, wave sifting or for control of the space charge impulse. The intermediate electrode system is inserted at the axis of the tube, preferably between a pair of symmetrically disposed cathodes.

Because the amplification factor or the grid permeability and the grid diameters are factors in determining the frequency at which maximum power is produced the valve is made with different grid diameters and grid spacings, as well as smaller or larger central anodes. The effect of such grid devices is analogous to the resonance curve of coupled oscillation circuits in that the valve is caused to operate efficiently over a wide frequency band and is capable of delivering effective power by reason of the various coupling arrangements.

Another improved feature of the transmitter valve is represented by the linear geometric electrode structures which are advantageous mechanically as well as electrically. The electrodes form or are connected to multiple wave conductors in which adverse wave shock joints are eliminated. This construction reduces the parasitic oscillations to a minimum. All electrode systems are arranged to provide steady tunable controls of the space charge density under various operating conditions so as to produce stable oscillations of high intensity over the desired frequency band.

Although the various novel features which are believed to be characteristic of this invention will be pointed out more particularly in the claims appended hereto, the broader aspects of the invention will be better understood by referring to the following description taken in connection with the accompanying drawings, in which, Fig. 1 is a schematic perspective illustrating the principles underlying the present invention;

Fig. 2 is a schematic transverse section of the electrodes of a duplex valve;

Fig. 3 is a similar transverse section of the electrodes of an "asymmetrical" valve;

Fig. 4 is a schematic perspective of the intermediate electrode system;

Fig. 4a is a schematic transverse section of the electrode arrangement showing the intermediate electrode system inserted in a simplex valve;

Fig. 5 is a chart of connections and manner of working illustrating the different tuning and working conditions of the valve with or without the intermediate electrode system;

Fig. 6 is a side elevation of the electrode supports of a valve embodying this invention;

Fig. 7 is a transverse section therethrough;

Fig. 8 is a longitudinal section of the valve embodying the electrode system shown in Fig. 6 and taken at right angles to the plane of Fig. 6;

Fig. 9 is a side elevation of the electrode arrangement including the intermediate electrode system;

Fig. 10 is a transverse section thereof;

Fig. 11 is a longitudinal section of a valve embodying the electrode arrangement of Fig. 9 and taken at right angles thereto;

Figs. 12 and 13 are top and side elevations, respectively, showing the electrode system and supports of Figs. 9 to 11 on a large scale; and Figs. 14 to 35 are schematic diagrams illustrating the different connections designated in the chart of Fig. 5 and showing the different working conditions and tuning arrangements of the valve.

Figure 14:
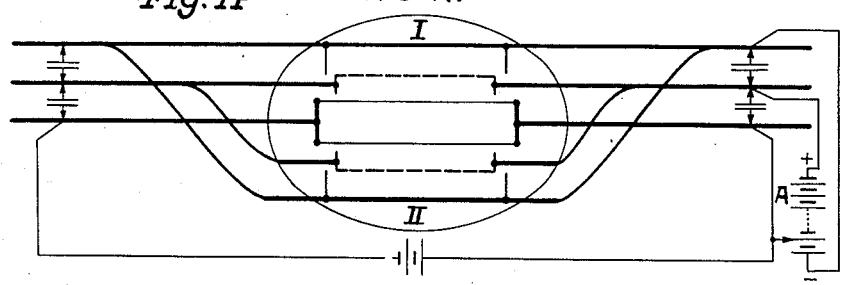

Referring to the drawings more in detail, the simplex transmitter valve consists of the cathode filaments 1 and 2 which are fastened to the linear wave conductors 5 and 6 by means of the flexibly formed clamps 3 and 4 as shown in Figs. 1, 6, 7 and 8. This arrangement forms the axis of the valve system in which the independent grids 7 and 8 and the anodes 9 and 10 are concentrically arranged around the cathode filaments and are connected to linear wave conductors 11 to 14 and 15 to 18, respectively. It is to be noted in this construction that the grids and anodes are formed as segments of cylinders and are arranged concentrically and co-axially with respect to the axis of the cathodes.

Fig. 2 shows a section of a similar electrode arrangement as applied to a duplex valve. In this figure the cathode filaments 1a, 1b and 2a, 2b are arranged around an axis 5a and are supported by star shaped flexibly formed clamps 3a about which the grid systems 7a, 7b and 8a, 8b and the anode systems 9a, 9b and 10a, 10b are concentrically disposed so that the duplex valve possesses the same electrical characteristics as the simplex transmitter valve.

The same conditions apply to the asymmetrical structure shown in Fig. 3. The odd number of electrode systems which does not result in a reflecting system justifies the expression "asymmetrical" which can be applied to all odd electrode arrangements. As with the above mentioned arrangements, cathode filaments 1c, 1d and 1e are supported by flexible clamps 3b about an axis 5b, a grid anode system being concentrically arranged around each cathode filament.

If the intermediate system (Fig. 4) is inserted within the axis of the simplex transmitter valve of Fig. 1 as shown by the schematic cross-section of Fig. 4a, control of space charge impulses can be effected within the transmitter valve.

The intermediate electrode system consists of the rectangular grid ring 19 surrounding the cathode filaments 1, 2 with a helical arrangement 19a and ending in oppositely disposed conductors 20, 21. The system also includes the plane anode 22 which likewise is supported by two opposite conductors 23, 24.

The following text explains an example of the simplex transmitter valve of Figs. 6, 7 and 8 and the transmitter valve with intermediate electrode system in Figs. 9 to 13. The elliptical glass body 25, consisting of hard glass, which may be highly resistant to heat, is fused with the cross-squeezed feet 26, 27 consisting of the same kind of glass. The conductors 5, 6 and 11 to 18 and the supports 47, 47a and 48, 48a for the stabilization braces 28, 29 (Fig. 6) are sealed into these cross-squeezed feet as shown in Figs. 7 and 10.

The anodes 9, 10 in the shape of a sector of a cylinder are stiffened by welded backstraps and equipped with muff-shaped sliding guides 30, 30a. The latter are joined to the conductors 15 to 18 and are fastened thereto at one side by rivets or welding. At the other side the sliding guides 30, 30a are split in such manner that they can slide on the conductors 15 and 17 in response to longitudinal expansion of the anodes caused by thermal strain.

The grids 7, 8, likewise in the shape of a section of the cylinder consist of heat resisting metal rods, each welded together at the end by a band. The grids are fastened to the claw-shaped grid supports 32, 33 by the grid holding rods 31, 31a (Fig. 8). The slightly bent conductors 12, 14 and 11, 13 hold the grid structures in co-axial and concentric position to the anodes 9, 10 and the cathode system 1, 2. The grid supports 32, 33 are rigidly connected with the lead-ins 12, 14 by rivets or spot-welding, while the grid supports 32a, 33a are formed as sliding guides for the same purpose as described in the anode connection sliding guides 30, 30a.

The cathode system arranged at the axis of the electrode system consists in shells 34, 34a (Fig. 6) to which the clamp-shaped cathode tension springs 35, 35a (Figs. 6 and 8) are fastened. These springs terminate in the cathode supporting bridges 3, 4, the bent over bonds of which hold the cathode filaments 1, 2 tightly wedged. The devices forming the cathode supports, are by means of the shells 34, 34a rigidly fastened on both sides to the wave conductor lead-ins 5, 6 by rivets or spot-welding. Since the clamp shape of the cathode tension springs 35, 35a possess considerable reflection effect for quasi-optical waves, movable tape wave conductors 36, 36a (Fig. 6) are provided for bridging these clamps.

Another cathode holding and tightening device offering many practical advantages and which is especially adapted for cases of varied expansion of the two cathode filaments 1, 2 is shown in Figs. 12 and 13. The clamp 38, which is bent four times and which serves as a support and linear guide to the springs 39, 40 is fastened to the plug shell 37. The clamp 38 possesses two borings in which the draw tubes 41, 42 slide. The cathode filaments 1, 2 are led through these tubes and are protected against sliding out again at the end of each tube by sharp-edged projections. The springs 39, 40 are supported in the pot-shaped spring plates 43, 43a fastened to the clamp 38 and which are centrally perforated for the passage of the draw tubes 41, 42. Their movable end is situated in the centrally perforated spring plates 44, 44a. The transfer of the flexibility to the draw tubes 41, 42 is effected either by the flattening of the tubes above the plates 44, 45 or by a ring fastened to the tube at that place. The tape wires 45, 45a serve as current leads and are fastened to the draw tubes 41, 42 and to the shell 37 by means of clips. With this cathode tension device the other ends of the cathode filaments are wedged into a cathode supporting bridge 37b situated at the plug shell 37a.

The stabilization braces 28, 29 (Figs. 13 and 6) are provided in order to give the whole system an increased stability and resistance against unintended deformations which might occur during the installation, the adjustment or during the sealing in of the electrode system in the glass bodies. They consist of appropriately bent glass rods or glass tubes 28, 29 into which metallic connecting rods 28a, 29a are sealed in on each end. Owing to the connecting shells 46, 46a and the bent-off connecting supports 47, 47a and 48, 48a sealed in the cross-feet 26, 27, a rigid frame is obtained as a base for the electrode system.

The intermediate electrode system consists of a closed wire rectangle 19, to the longitudinal sides of which are welded the spiral windings 19a (Fig. 4), the course of which is concentric to the cathode filaments 1, 2. The grid system is supported by means of the rigid connection 50 (Figs. 12, 13) and the spring connection 49, bridged in its turn by a tape wire 51 for the wave conduction. The joining shells 52, 52a, in this case Y-shaped, maintain the grid system in fixed position with respect to the other electrodes while permitting longitudinal expansion. The support for the plane anode 22 which lies in the mid-plane and is arranged in symmetry to the whole system within the cathode system, is carried out in the same suitable manner. In this case, 53 is the rigid connection to the joining shell 54 which is connected to the conductor 24, while the spring connection 55 bridged by wave-conductor, tape 56 leads to the conductor 23 through the Y-shaped shell 54a.

Owing to the symmetrical structure and the separate bilateral lead-ins which serve as wave conductors, there results a great variety of working connection which may be effected externally for wave bands for different breadths.

The working variations consist in the type of connection, the tunings and couplings.

Types of connection to be used are the following:
1. The control connection for ultra-short waves (anode high positive, grid negative or positive);
2. The space charge oscillation connection for quasi-optical waves (grid high positive, anode more or less positive or negative); and
3. The connection for mixed frequency regions (grid and anode differently positive).

The systems can be used
(a) with each of these types of connection:
1. Single;
2. Parallel;
3. In push pull; and
4. Combinations of the above.

The tunings can be combined in the following manner: each system can be tuned independently either unilaterally or bilaterally, while the cathode axis can be tuned by plate bridges, either singly or in relation to the grids and anodes, by means of its independent wave conductor, or may be multiply combined by means of bridging capacities. The systems can be joined to a mutual two- or three-wave conductor system (parallel wire conduit or concentric tube arrangement) where the mutual tuning is effected. Common condenser bridges or metallic plate bridges as well as bridge clamps can be used as tuning means.

The couplings can be varied as will be explained below. With different connections it is advantageous to enlarge the natural coupling existing between the systems or to tune the separately tuned systems through additional coupling means. The variation of coupling can be achieved by changing the reciprocal position or the diameters of the single wave conductors coupled externally or, in case of a fixed position of these wave conductors, by capacitive or other known coupling devices.

As separate enumerations and separate explanations of the numerous variations of working, tuning and connection of the transmitter valve would only befog the description, a summary is given in Figure 5 explaining a combination of those conditions of operation in which the transmitter valve can be used. Out of each series a special example is explained by means of wiring diagrams.

In Fig. 5 the column "tuning" is to be read as follows:
A—G=Bridge between anode and grid wave conductors of the main systems.
a—g=Bridge between anode and grid wave conductor of the intermediate system.
A—K=Bridge between anode and cathode wave conductor of the main system.
a—k=Bridge between anode and cathode wave conductor of the intermediate system.
G—K=Bridge between grid and cathode wave conductor of the main system.
g—k=Bridge between grid and cathode wave conductor of the intermediate electrode system.
A—A=Bridge between the anode wave conductors of systems I and II.
G—G=Bridge between the grid wave conductors of systems I and II.

The tunings to be employed for a connection are designated by a circle in the line of the tuning series A, B and D marked with the ordinal number.

In the group C of the summary the wave conductors leading out at opposite sides of the tube are affected by variation of tuning on the right and left. The designations are the following:
r=Bridge only on the right
l=Bridge only on the left
r+l=Bridges on both sides of the generator system.

The designations "System I", "System II" refer to the two electrode systems of the symmetrical structure including their wave conduits leading out on both sides to left and right.

The column "type of connection" means:
(R) Connection for space charge oscillation, the grids getting a high positive positive tension as against the cathode, while the anodes are biased more or less negatively or, as per the present invention, weakly positively.
(S) Connection of control with high positive anode potentials and suitable grid biases.
(T) Connection for undamped oscillation. The grid gets a high positive tension while the anode is getting a slightly lower positive tension as against the cathode (anode secondary emission), or the anode gets the high positive tension and the grid the lower positive tension (grid secondary emission).

Within the series A, B, C, D each possibility of tuning specified in the column "tuning" can be combined with each "type of connection" specified in the next column.

*Series A.*—Contains the combinations of the connection for parallel operation of both the systems on a mutual multiple wave conductor tuning system joining both systems. The connection A—3—R is represented in Figure 14. On the triple wave conductors joining both Systems I and II right- and left-sidedly the anode wave conductor is tuned against the grid wave conductor by a capacitive wave short-circuit bridge A—G as per "tuning 3" and, on the other side, the grid wave conductor is tuned against the cathode wave conductor G—K. The nodal- and phase-position of the resulting oscillation is defined by suitable shifting of these bridges which are so constructed mechanically that they can slide past each other. In the given example (type of connection R) space charge oscillations are effected. For this purpose the positive tension of the one battery is supplied to the grid wave conductor at the bridging point, and the supply of the negative or positive biasing potential to the anode as well as that of the filament current from the other battery is likewise effected through these points as shown by Figure 14. The free ends of the wave conduits can also be used as voltage supply.

A stationary wave condition arises on the cathode system in consequence of the resonance tuning of the intermediate electrode system, the space charge oscillating within the space of the grid cathode thereby being subjected to an additional control of the space charge.

Figure 15:
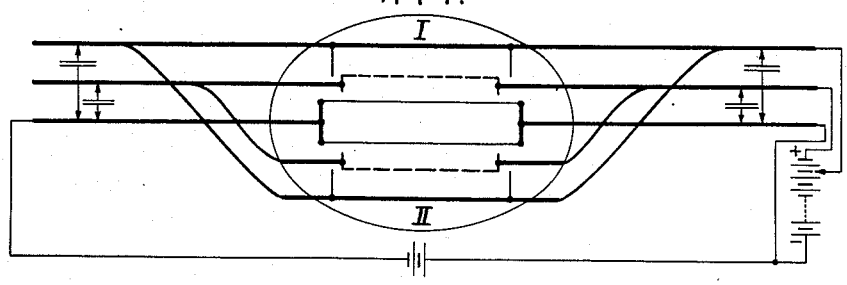

Another connection of series A, that is the combination A—4—T, is shown by Figure 15. The tuning is effected between the anode-cathode wave conductors and the grid-cathode wave conductors. In this case the excitation to oscillation is achieved within the anode-cathode space or, according to the distribution of voltage, within the grid-anode space, by means of the "negative resistance" arising in consequence of falling characteristics.

When working in control connection S it has to be taken into account that, with regard to the above-mentioned tuning series A, as well as to all the other tuning series, the multiple wave conductor systems, on generation of waves of the ultra-short wave range, are to be considered as more or less quasi-stationary oscillatory circuits, which, instead of the capacitive short-circuit-bridges, possess variable condensers with low maximum capacity as tuning or coupling conductors.

Figure 16:
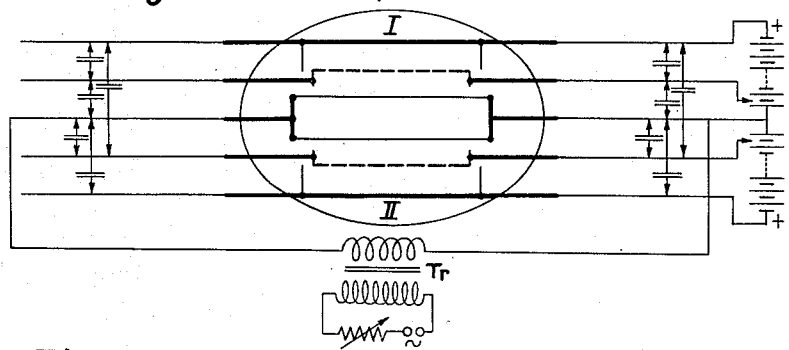

*Series B.*—Contains the conditions for separate tuning of the Systems I—II. The connection B1—b—α, Figure 16 is given as example. System I is both-sidedly tuned on the grid-anode and grid-cathode wave-conduit, System II is likewise tuned on the anode-cathode and grid-cathode conduit. The stabilization coupling, anode of System I to grid of System II, is an additional stabilization or resonant coupling of both systems which are already loosely coupled through the cathode axis. The waves of the ultra-short wave spectrum can preferably be produced in this type of connection b which has been shown and in which both systems are connected with positive anode and positively or negatively biased grid and where the condenser bridges are replaced by variable capacities. The use of separate batteries or of operating voltages separately regulable from a mutual battery, in connection with the tuning adjustments permits adjustment for optimal manners of working. Alternating current can be used as heating current for the cathodes as well as for nearly all the other connections, the regulation of this alternating current being suitably effected on the primary side of the transformer as shown in Figure 16.

Figure 17:
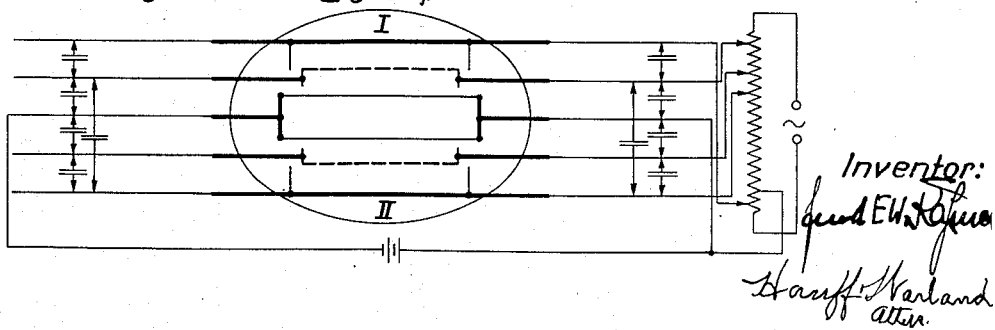

An extension of the frequency region on slightly diminished efficiency is obtained by applying different manners of working for both systems. Figure 17 reproduces such a connection of the combination B6—e—β. System I is operated in connection of space charge oscillation, System II in undamped oscillation. An alternating current, of which only the positive half-wave is utilized in consequence of the rectifying effect of the transmitter valve, serves as operating voltage. The adjustment of the suitable voltages is achieved by tapping a resistance connected as a potentiometer. Both systems are homogeneously symmetrically tuned, i. e. between grid-cathode and grid-anode conduction while the coupling bridge additionally couples the grid of System I with the anode of System II.

The extraction of energy from oscillation systems for quasi-optical and ultra-short waves is generally effected by capacitive or inductive coupling of the receiver system to the generator system. Such transmission of energy can be used with the connections of the series A and B as well as with the series C and D mentioned below. However, these usual manners of coupling have the disadvantage of being more or less undefined and difficult to be reproduced and only in exceptional cases allow for the attainment of an advantageous coupling value. The solution of the problem of an optimal coupling of the energy-receiving system to the generator system is found by the symmetrical structure of the electrode system.

Through work tests it was found that when operating only one valve system, a considerably greater extraction of energy is possible from the other system than when using any other known manner of coupling of the receiver to the generator. This effect is caused by the fact that a coupling system results in consequence of the absolutely homogeneous structure of the systems supplying and extracting energy as well as of the symmetrical coupling of both systems through their reciprocal capacities, on the one hand, and the direct conductive coupling of the cathode axes on the other hand.

Figure 18:
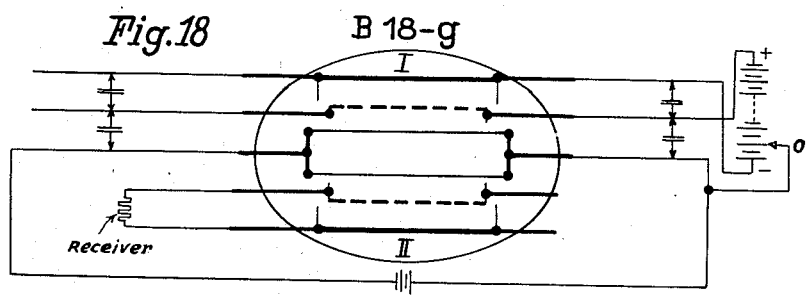

Such a connection is shown by Figure 18. System I is operated as generator as per connection B18—g while System II is not directly connected but has the function of a coupling system.

The connections B1 to B20 shown by the chart of Figure 5 in combination with the three manners of working g—h—i allow for the utilization of the numerous applications of this new type of resonance coupling of the receiver to the generator system. For this purpose the receiver system can be bilaterally or unilaterally tuned (System II B1—B16) or need not be tuned (System II B17—B20).

Figure 19:
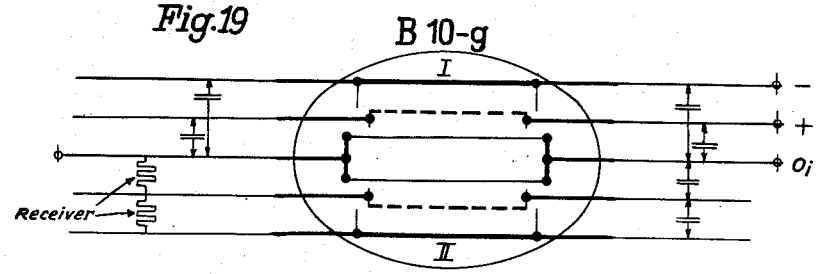

Figure 19 shows an unilaterally tuned receiver system according to connection B10—g. The real receiver V can be situated among one of the three homogeneous wave conductor systems, anode-grid, anode-cathode or grid-cathode; also two receivers can be inserted between each two systems as demonstrated. Adapted load resistances are sketched into the Figures 18—19 to represent receiver V.

Figure 20:
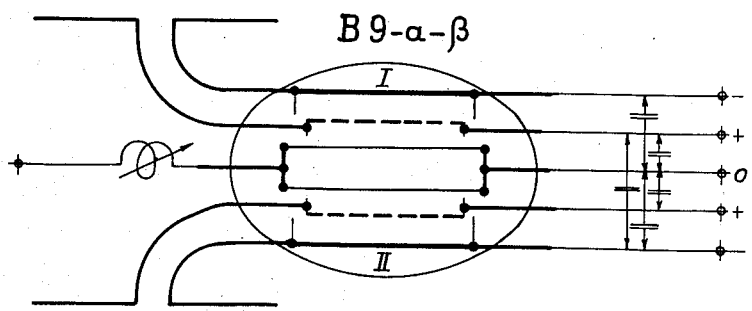

In the known manner dipole radiators can likewise be connected as energy receivers, i. e.

unilaterally in the above-explained coupling of resonance as per invention, as well as twofold in case of systems bilaterally operated by means of tension. These dipole radiators can for instance be set up at the tuning bridges of one or both systems. In case of only unilateral tuning of the System I or II and unilateral use of the wave conductors situated at the other side of the valve as tuned or aperiodic wave energy conductors to the dipole radiators, concentrated electromagnetic radiation fields can be obtained. The oscillations radiated from the dipole aerials can be used for varied purposes. Such an arrangement of dipole aerials is represented in Figure 20 where the wave conductors consist of supply circuits which can be drawn out while the other side of the transmitter system is tuned according to connection B9—a. For this purpose of bilateral tuning of the cathode system, in this case a resonance choke tunable to the frequency in question, is inserted on the radiation side (side of energy extraction).

Figure 21:
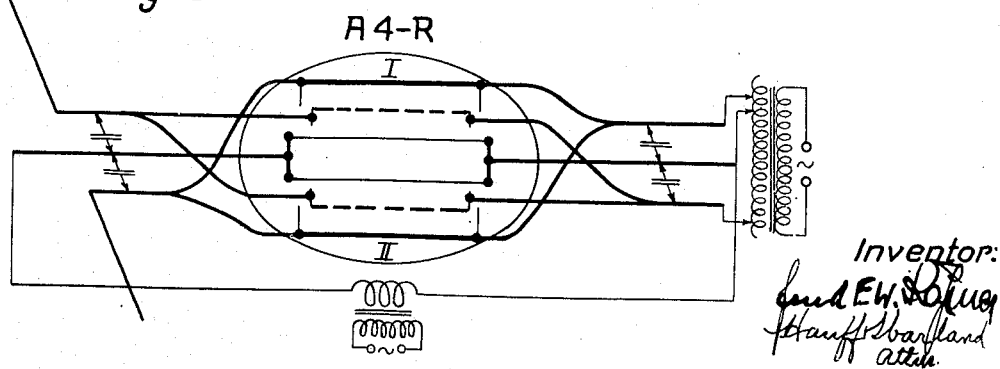
Figure 22:
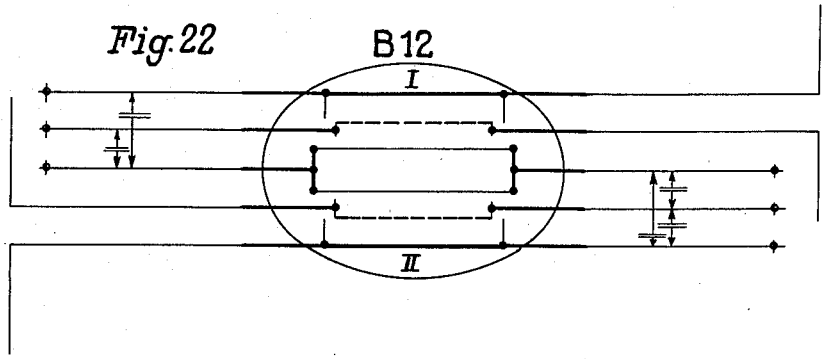

The unilateral duplex tuning connection (Figure 20) can also be replaced by the unilateral parallel tuning according to the connection A4—R (Figure 21) where the wave conductors of the Systems I and II are parallel connected to a mutual energy conduit. In this arrangement the cathode axis can also be tuned by means of reflection bridges as shown in Figure 21. Another combination of connection with duplex-effect, dipole aerials is shown by Figure 22 according to connection B12 taken from Figure 5.

In Figure 21 alternating current is again used as operating voltage. As such alterations of voltage determine the frequency which is generated, especially in cases of the connection of space charge oscillation and of undamped oscillation, a series of juxtaposed frequencies arise within the generator instead of one constant frequency, that is, summarily speaking, a frequency band of definite width which proves to be advantageous in many cases, for instance for excitation of molecular unions, and dipole liquids within the region of anomalous dispersion bands. Low, medium or high frequency currents may be used for excitation according to requirements. In every case an ultra-high frequency band of definite width arises in the valve oscillator simultaneously with modulation.

Figure 34:
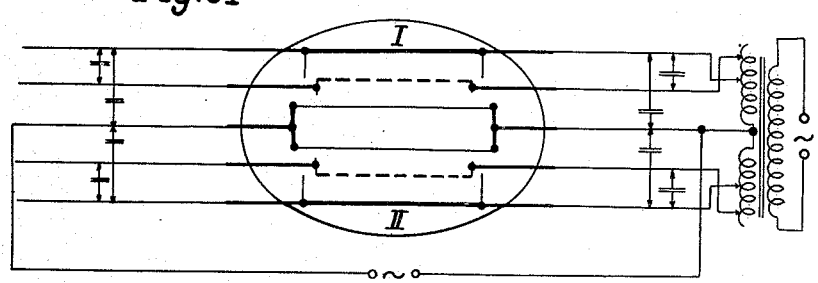

A more advantageous embodiment of the transmitter system with simultaneous duplicating of the operating intervals per time unit is effected by using the supply of push pull or double communication of both systems. This manner of connection which is shown in Figure 34 for a valve connected as per B1—c for undamped oscillations only becomes possible by reason of the symmetrical structure of the transmitter valve system.

Figure 35:
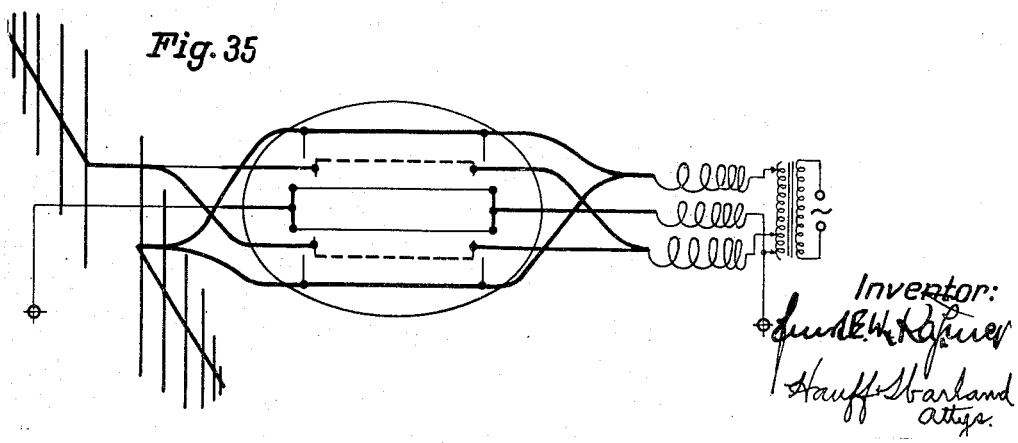

The generation of a remarkably intensive and wide frequency band can be effected by excitation of so-called "wild oscillations". Its generation is especially promoted by interpolation of vibratory chokes or coils possessing no decided natural frequency as well as by supply of alternating current of the valve. A connection for production and radiation of these oscillations by means of this transmitter valve is given in Figure 35. In order to obtain an optimal radiation of all frequencies produced, the dipole aerial carries resonance radiators of varied length.

Figure 23:
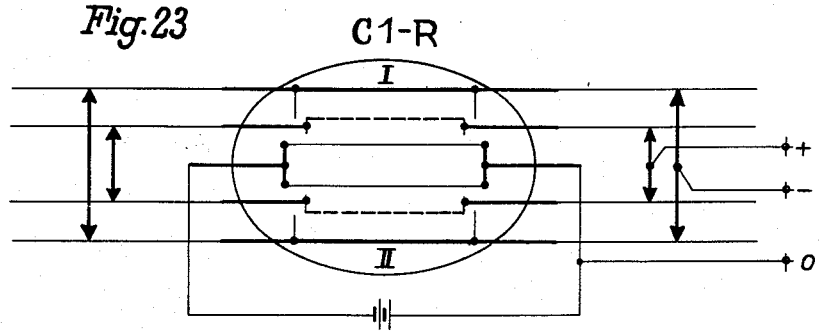

Another quality of the transmitter valve lies in the fact that push pull oscillations can be generated in a single valve of this type. Pure arrangements of push pull oscillations are collected in the series C1—C4. Figure 23 represents the connection C1—R. The anode and grid wave conduits of both systems are bilaterally connected to the push pull arrangement by means of tuning elements which in this case have the shape of shiftable metallic clamps. A variation of coupling between the grid and the anode push-pull circuit can be effected either by mutual variation of both the tuning wave conduits in such a manner that these conduits are moved out of the wave conductor plane by a predetermined angle, or by special coupling bridges between anode and grid wave conduits. The types of operating for these push-pull connections are connections of space charge or oscillation of control, the cathode system not being subjected to tuning. With the above-mentioned connection a wave band of larger oscillation—and effective power of about 0.33—1.1 metres can be produced without a gap, the lengths l of the wave conductors measured from the middle of the valve to the tuning bridge depending from the produced wave length as per Table 1.

Table 2 gives a summary of the dependence of the operating voltages from the regions of wave length.

Figure 24:
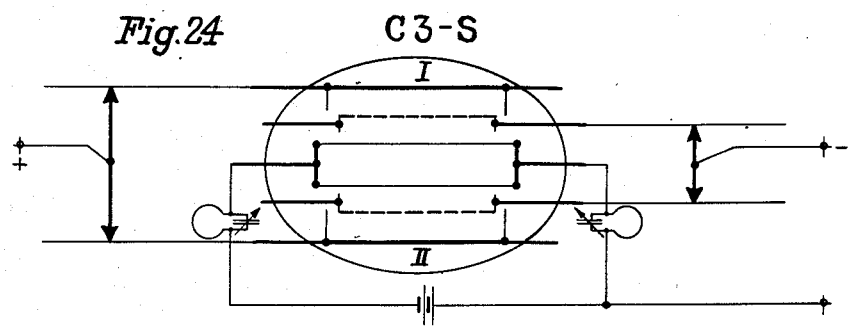

The connection C3—S (Figure 24) by which the wave lengths $\lambda=2.45$ to $\lambda=4.5$ metres can be obtained without gap is particularly appropriate for the generation of ultra-short waves with especially high efficiency. Table 3, below, shows the dependence of the tuning-system-lengths $l$ and $r$ from the produced wave lengths.

*Table 1*

| l cm | λ cm |
|---|---|
| 19 | 32.9 |
| 23 | 37 |
| 32 | 54.8 |
| 39 | 73.6 |
| 42 | 79.4 |
| 59 | 88.0 |
| 62 | 107.6 |

*Table 2*

| Region | Eg volt | Ea volt | λ cm |
|---|---|---|---|
| I | 125÷300 | −45÷−5 | 110÷45 |
| II | 150÷300 | −100÷−25 | 45÷30 |

*Table 3*

| | | | cm |
|---|---|---|---|
| l | 19 | 37 | 57 |
| r | 19 | 37 | 57 |
| λ | 245 | 360 | 450 |

Figure 25:
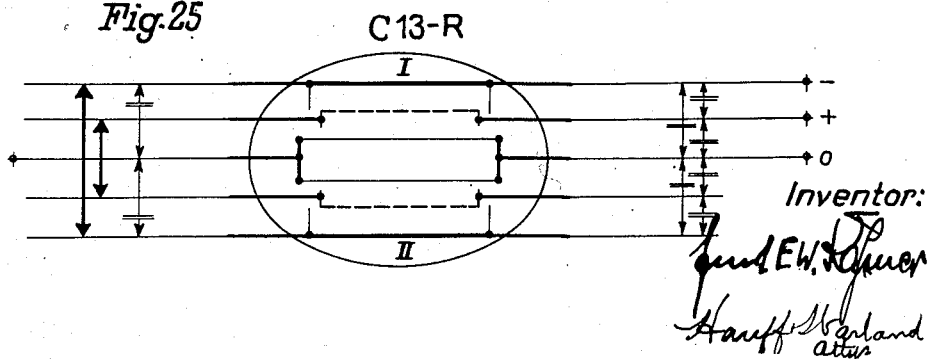

The same manner of working also permits the excitement of higher frequencies, that is if the energy distribution on the oscillation systems do not manifest themselves in the form $$(2n-1)\frac{\lambda}{2}$$

where the alternating potentials of the anodes and grids lie in phase opposition, but in the form $n.\lambda$ which means an equi-phase of anode and grid tensions. This type of oscillation can be stabilized by additional tuning of the cathode system. C5—G14 are such connections working symmetrically or asymmetrically push-pull-like, but in equi-phase and which constitute an extended continuation of the combinations cited in Series B as the A—A and G—G bridges of the Series C in varied connections with the other tuning bridges effecting additional couplings of both systems as shown in Figure 25. If capacitive tuning bridges are used instead of the conductive tuning clamps A—A and G—G, a separate supply of voltage is given for each system. However, the character of these oscillations does not allow for a mixed type of working (for example R and S).

The connections for the intermediate electrode system are to be taken out of Series D. They possess the same character and the same possibility of variation as the main Systems I and II in Series A. On principle all three types of working can be adjusted. Each of the bilateral tunings of the intermediate electrode system can be combined with all tunings cited in Series A, B and Series C5—14, however the intermediate electrode system has to operate in the same type of working as the main system and the latter cannot be connected in mixed type of working (Series B$d$ to B$h$). Figure 26 shows the connection D1—R/B10$a$. The intermediate electrode system is tuned in the anode grid and anode cathode wave conductor as per D1, System I according to B10 between anode-cathodes and grid cathode wave conductors, System II between anode-grid and grid-cathode wave conductors. All systems are arranged for space charge oscillation, the swinging of the layer of space charge being amplified in its intensity by the control of space charge impulse produced by the intermediate electrode system and excitations of harmonics being released according to the distribution of tension. In cases of main Systems I and II being parallel connected to mutual tuning wave conductors according to Figure 27 in which the intermediate electrode system is tuned according to D2 and the main system to A3, this increase of energy is equally effected by control of space charge impulse.

The intermediate electrode system constitutes an additional coupling factor for the two systems I and II by means of its structure and its arrangement within the main system of the transmitter valve. In this capacity and apart from other uses the intermediate electrode system can be used for the purpose of extracting energy, for instance for a dipole radiator, as tuned or untuned coupling system not operated by means of tension as shown in Figure 28. The intermediate electrode system to the grid and anode wave conductors of which a dipole aerial is uni-laterally connected, extracts the energy radiated out of the dipole from the main system operated in connection B7—$a$. This additional coupling of both the systems by means of the intermediate electrode system is also of importance for the extraction of energy by only one system of the main systems not connected by means of tension. Figure 29 gives an example showing System I operated as per connection B18—$g$, while System II is supplying energy to the receiver V. An additional coupling of System I to System II is effected through the intermediate electrode system which is tuned as per D3 and is likewise operated in connection of space charge oscillation.

Figure 30:
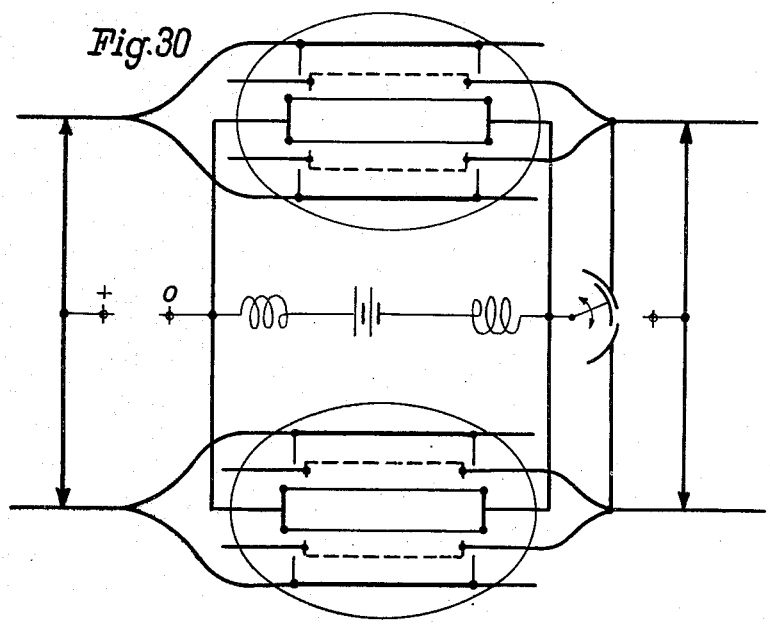

A remarkable increase in power and degree of efficiency of oscillation energy generation is obtained within a wide region of the ultra-short wave spectrum above 2 metres by operating two transmitter valves in parallel, especially in push-pull connection. In the differential duplex connection shown in Figure 30 the grid and anode wave conductors of each valve are parallel connected and tuned in push-pull. The differential condenser which is arranged unilaterally and which can be situated in the grid or anode push-pull wave conduit, allows for the adjustment of the right phase position of the oscillations in the cathode system, the supply-leading connections of which should suitably be blocked by tunable resonance chokes or resonance circuits in order to avoid the flowing away of the high frequency energy. The following Table 4 gives a synopsis of the tuning lengths of the push-pull wave conduits in dependence of the produced wave lengths, a degree of efficiency of about 40% having been achieved in this arrangement.

*Table 4*

| $a$ cm | 30 | 25 | 15 | 5 |
|---|---|---|---|---|
| $b$ cm | 10 | 5 | 5 | 0 |
| $\lambda$ cm | 490 | 460 | 440 | 350 |

Figure 31:
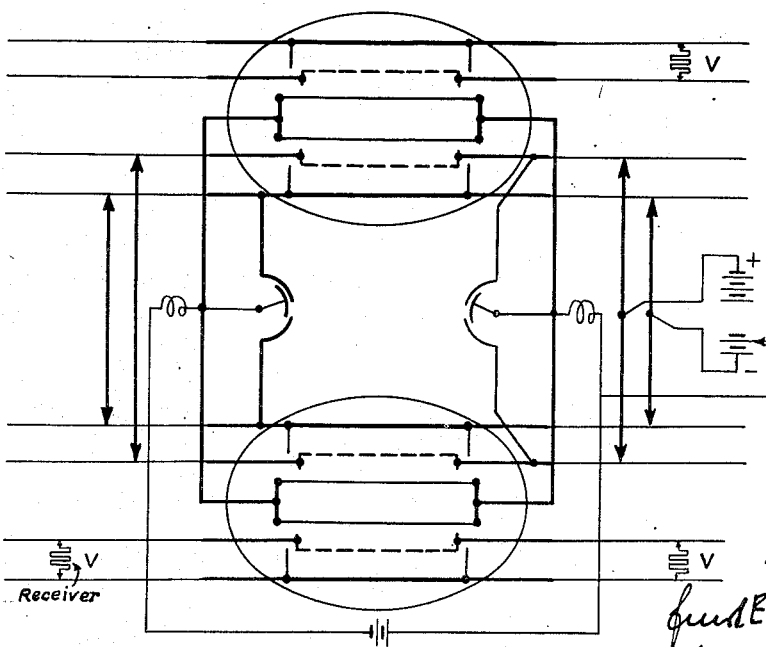

The connection as per Figure 31 is suited for the generation of a frequency band of still shorter ultra-short waves; a differential duplex connection where however only one system of each valve is operated in push-pull connection as against that of the other, is equally adequate; the other two systems are utilized in the function of the optimal energy-extracting coupling system. In this connection a wave band from 2.90 metres to 2.05 metres with a likewise remarkable degree of efficiency is for instance produced by control connection. Table 5 shows the dependence of the wave conductor tuning length from the produced wave length.

*Table 5*

| $l$ cm | 20 | 15 | 10 | 5 | 0 |
|---|---|---|---|---|---|
| $r$ cm | 16 | 16 | 16 | 16 | 16 |
| $\lambda$ cm | 290 | 260 | 245 | 220 | 205 |

An oscillation region of still higher frequencies is obtained with the same connection if, as shown by the dotted drawing in Figure 31, the other side of the cathode system is likewise coupled to the grid push-pull wave conduit by means of a differential condenser. In this case there obviously occurs an additional control effect caused by the bilaterally coupled cathode axis, an excitation of oscillations of higher frequency being effected thereby. Table 6 contains a combination of some of the values measured at this arrangement of connections.

*Table 6*

| $a$ cm | 25 | 20 | 10 | 10 |
|---|---|---|---|---|
| $b$ cm | 25 | 15 | 10 | 5 |
| $\lambda$ cm | 194 | 176 | 166 | 150 |

Figure 32:
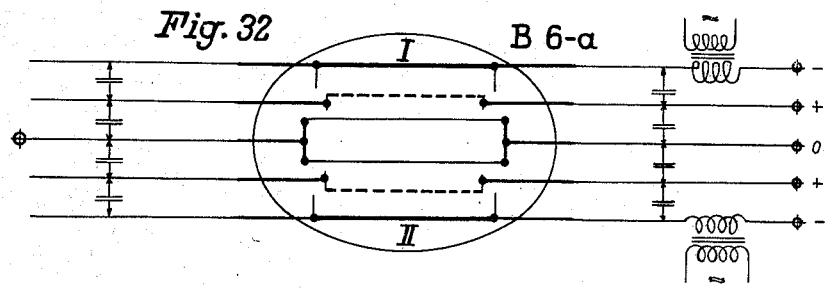
Figure 33:
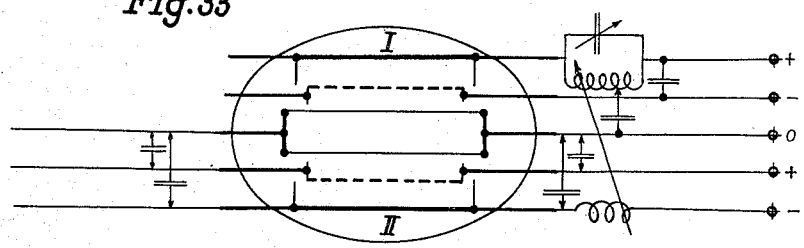

All usual manners of modulation can be applied for the modulation of the ultra-short and quasi-optical waves produced with the transmitter valve in the mentioned connections. The novelty of this transmitter valve lies in the possibility of an independent duplex modulation in such a manner that, as schematically shown in Figure 32, one modulating tension is, for instance by transformers, superposed to each of the anode voltages of the two systems operating for instance as per connection B6—$a$. A duplex modulation through the grid tensions is appliable in the same manner. The modulation and carrier frequency can, in addition, be carried out in one valve, which is very important in case of a modulation of high frequency. Figure 33 shows such a connection. System I is in the known way connected as high frequency generator variable in its frequency. The frequency generated by it is superposed to the supply tension of the ultra-frequent oscillating System II by means of an induction coil as shown in Figure 33 or otherwise.

Summarized the advantages of the transmitter valve which result out of the various system arrangements, arrangements of connection, tuning and operation with inserted intermediate electrode system as has been shown, are very versatile, as afore-mentioned. The advantages consist in the extending of the frequency band within which useful oscillation energy can be extracted, produced in one way by the diminution of capacity in consequence of splitting up into single systems, and in the other way by the insertion of the intermediate electrode system into the axis; further, in comparison to usual types of valves, in the considerable increase of intensity of the delivered oscillation energy by control of space charge density in the grid cathode space produced by tuned stationary wave conditions on the symmetrically axial cathode wave conductor.

Another advantage is the stabilization of oscillations observed with the parallel connection of single valves, which is particularly strongly marked in the present system in consequence of the internal mixed coupling of the two single systems and the fixed couplings, adjustable according to desire, on the external side through the cathode wave conductor, and which causes a coherence of the oscillations of all systems emitting power.

When applying the intermediate electrode system, there results another advantageous intensification and extension of this stabilization of frequency combined with highest frequency controls of space charge impulse, which cause excitations of harmonics of high intensity and which can be extracted as effective power either alone or as wave band by means of corresponding couplings.

A further advantage of the structure lies in the fact that the transmitter valve can be used for generation of oscillations in push-pull connections. As, in this case, the two systems oscillating in push-pull can be considered as connected in series (contrary to the parallel connection of a duplex valve system oscillating in synchronism), the effective dynamic capacity of the system is considerably reduced by this connection in series of the system capacities, a controllably commanded extension of the region of the useful oscillation powers according to high frequencies into the centimetre wave spectrum ensuing thereby.

In addition, another widening of the frequency band can be obtained through the present valve system by developing the systems non-homogeneously, for instance in such a manner that one system works maximally at low frequencies, the other one at some higher frequencies, and the intermediate electrode system at the frequencies lying between them. This is effected as per invention by the arrangements of different grid magnification factors or varied distances of electrodes as well as by slit anodes or the like, the natural couplings of the grid anode systems, which can be still intensified by external additional couplings, in this case permitting an oscillation regulation by means of the cathode axis, this oscillation regulation effecting the coupling and separate control of the systems among each other.

As the supplies of current and tension for the transmitter valve can be separately effected through the wave conduits belonging to each system, the wave resistances of the internal electrode structure allowing for their being adapted to those of the wave conductors externally connected, each system is to be separately regulated to the optimal working condition which offers particular advantages for extracting effective power directly or by coupling of a receiver system.

Having now particularly described and ascertained the nature of my said invention, and in what manner the same is to be performed, I declare that what I claim is:

1. A space discharge tube for producing undamped electric oscillations particularly in the ultra-short and quasi-optical wave range, said tube having a plurality of parallel spaced cathodes symmetrically arranged with respect to the axis thereof and having a corresponding plurality of sets of grids and anodes constituting electrode systems, said grids and anodes having the shape of open cylinder sectors, the grid and anode of each set being substantially concentric with the corresponding cathode with their open concave sides toward the axis of the tube, the grids and anodes of the respective sets being peripherally displaced about the axis of the tube and substantially enclosing said cathodes.

2. A space discharge tube for producing undamped electric oscillations particularly in the ultra-short and quasi-optical wave range, said tube having a plurality of parallel spaced cathodes symmetrically arranged with respect to the axis thereof and having a corresponding plurality of sets of grids and anodes constituting electrode systems, said grids and anodes having the shape of open cylinder sectors, the grid and anode of each set being substantially concentric with the corresponding cathode with their open concave sides toward the axis of the tube, the grids and anodes of the respective sets being peripherally displaced about the axis of the tube and substantially enclosing said cathodes, said tube having an intermediate electrode system comprising grids and anodes positioned between said cathodes, each cathode being enclosed by a grid of the intermediate system and the anode of the intermediate system being arranged in the mid-plane of said cathodes.

3. A space discharge tube for producing undamped electric oscillations particularly in the ultra-short and quasi-optical wave range, said tube having a plurality of parallel spaced cathodes symmetrically arranged with respect to the axis thereof and having a corresponding plurality of sets of grids and anodes constituting electrode systems, said grids and anodes having the shape of open cylinder sectors, the grid and anode of each set being substantially concentric with the corresponding cathode with their open concave sides toward the axis of the tube, the grids and anodes of the respective sets being peripherally displaced about the axis of the tube and substantially enclosing said cathodes and separate leads to the electrodes of said systems connected to separately tune said systems for oscillating at different frequencies.

4. A space discharge tube for producing undamped electric oscillations particularly in the ultra-short and quasi-optical wave range, said tube having a plurality of parallel spaced cathodes symmetrically arranged with respect to the axis thereof and having a corresponding plurality of sets of grids and anodes constituting electrode systems, said grids and anodes having the shape of open cylinder sectors, the grid and anode of each set being substantially concentric with the corresponding cathode with their open concave sides toward the axis of the tube, the grids and anodes of the respective sets being peripherally displaced about the axis of the tube and substantially enclosing said cathodes, means individually tuning said systems and a coupling element within said tube interconnecting said systems for mutual energy transfer.

5. A space discharge tube for producing undamped electric oscillations particularly in the ultra-short and quasi-optical wave range, said tube having a plurality of parallel spaced cathodes symmetrically arranged with respect to the axis thereof and having a corresponding plurality of sets of grids and anodes constituting electrode systems, said grids and anodes having the shape of open cylinder sectors, the grid and anode of each set being substantially concentric with the corresponding cathode with their open concave sides toward the axis of the tube, the grids and anodes of the respective sets being peripherally displaced about the axis of the tube and substantially enclosing said cathodes, said systems being connected in push-pull relationship to an external circuit.

6. A space discharge tube for producing undamped electric oscillations particularly in the ultra-short and quasi-optical wave range, said tube having a plurality of parallel spaced cathodes symmetrically arranged with respect to the axis thereof and having a corresponding plurality of sets of grids and anodes constituting electrode systems, said grids and anodes having the shape of open cylinder sectors, the grid and anode of each set being substantially concentric with the corresponding cathode with their open concave sides toward the axis of the tube, the grids and anodes of the respective sets being peripherally displaced about the axis of the tube and substantially enclosing said cathodes and wave conductors connected to said cathodes, grids and anodes and extending on opposite sides thereof to the outside of the said tube to provide connections to an external circuit.

7. A space discharge tube for producing undamped electric oscillations particularly in the ultra-short and quasi-optical wave range, said tube having a plurality of parallel spaced cathodes symmetrically arranged with respect to the axis thereof and having a corresponding plurality of sets of grids and anodes constituting electrode systems, said grids and anodes having the shape of open cylinder sectors, the grid and anode of each set being substantially concentric with the corresponding cathode with their open concave sides toward the axis of the tube, the grids and anodes of the respective sets being peripherally displaced about the axis of the tube and substantially enclosing said cathodes, supports attached to both ends of said grids, lead-ins at one end of said tube rigidly connected to said supports and lead-ins at the other end of said tube slidably connected to said supports to permit expansion and contraction of said grids.

8. A space discharge tube for producing undamped electric oscillations particularly in the ultra-short and quasi-optical wave range, said tube having a plurality of parallel spaced cathodes symmetrically arranged with respect to the axis thereof and having a corresponding plurality of sets of grids and anodes constituting electrode systems, said grids and anodes having the shape of open cylinder sectors, the grid and anode of each set being substantially concentric with the corresponding cathode with their open concave sides toward the axis of the tube, the grids and anodes of the respective sets being peripherally displaced about the axis of the tube and substantially enclosing said cathodes, tensioning devices supporting the ends of said cathodes and wave conductors shunting said tensioning devices to reduce the impedance of the support for ultra-short waves.

9. A space discharge tube for producing undamped electric oscillations particularly in the ultra-short and quasi-optical wave range, said tube having a plurality of parallel spaced cathodes symmetrically arranged with respect to the axis thereof and having a corresponding plurality of sets of grids and anodes constituting electrode systems, said grids and anodes having the shape of open cylinder sectors, the grid and anode of each set being substantially concentric with the corresponding cathode with their open concave sides toward the axis of the tube, the grids and anodes of the respective sets being peripherally displaced about the axis of the tube and substantially enclosing said cathodes and glass stabilizing braces extending longitudinally of said tube and carrying sealed in connecting members at both ends to support the two ends of the electrode systems and securing the various electrodes in position.

10. A space discharge tube for producing undamped electric oscillations particularly in the ultra-short and quasi-optical wave range, said tube having a plurality of parallel spaced cathodes symmetrically arranged with respect to the axis thereof and having a corresponding plurality of sets of grids and anodes constituting electrode systems, said grids and anodes having the shape of open cylinder sectors, the grid and anode of each set being substantially concentric with the corresponding cathode with their open concave sides toward the axis of the tube, the grids and anodes of the respective sets being peripherally displaced about the axis of the tube and substantially enclosing said cathodes, certain of said electrode systems being connected to sources of operating voltage adapted to cause said systems to generate ultra-short waves, others of said systems being connected to the output circuit to form a coupling device for coupling said first systems to said output circuit.

11. A space discharge tube for producing undamped electric oscillations particularly in the ultra-short and quasi-optical wave range, said tube having a plurality of parallel spaced cathodes symmetrically arranged with respect to the axis thereof and having a corresponding plurality of sets of grids and anodes constituting electrode systems, said grids and anodes having the shape of open cylinder sectors, the grid and anode of each set being substantially concentric with the corresponding cathode with their open concave sides toward the axis of the tube, the grids and anodes of the respective sets being peripherally displaced about the axis of the tube and substantially enclosing said cathodes, said electrode systems being respectively tuned to different frequencies and means coupling said systems for energy transfer whereby one of said systems is caused to modulate the oscillations produced by the other of said systems.

ERNST EDUARD WILHELM KASSNER.